July 2, 1957        W. F. BURGE        2,798,126
SWITCH MECHANISM FOR FISHING ROD REELS
Filed Aug. 27, 1954        2 Sheets-Sheet 1
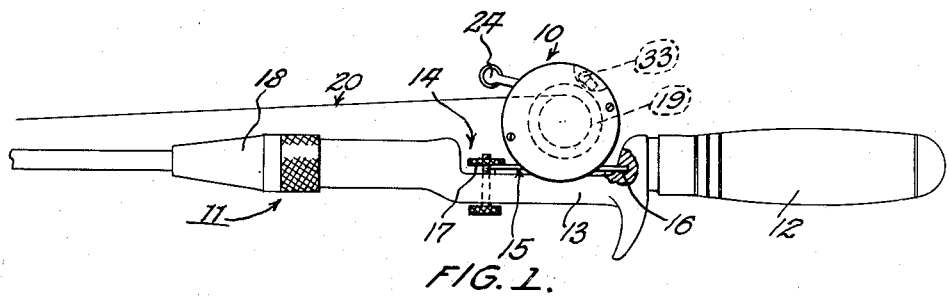
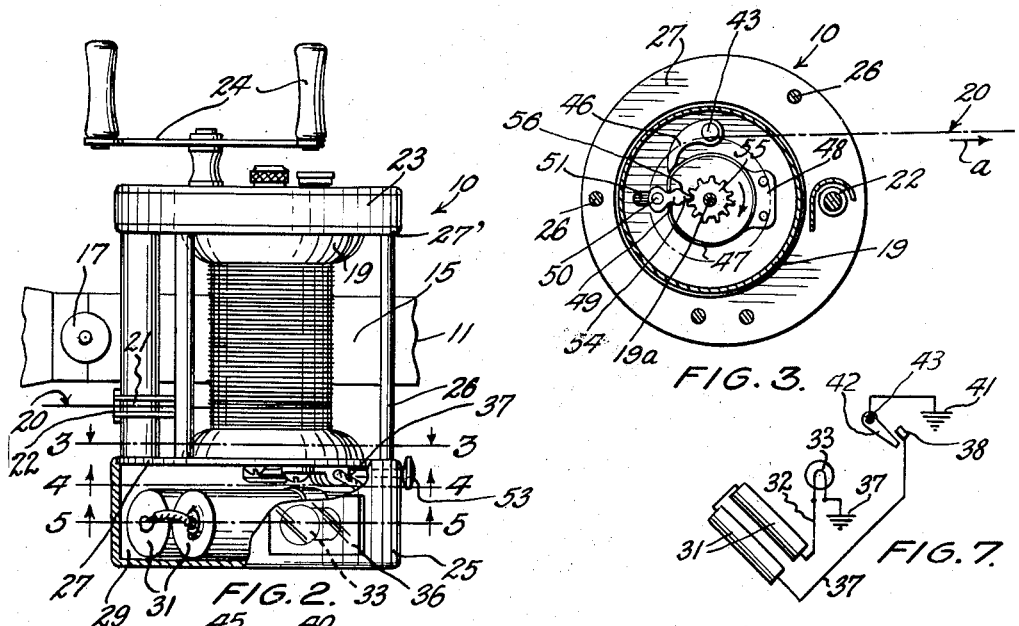
INVENTOR
Willetta F. Burge
BY *W. S. Rambo*
ATTORNEY July 2, 1957  W. F. BURGE  2,798,126
SWITCH MECHANISM FOR FISHING ROD REELS
Filed Aug. 27, 1954  2 Sheets-Sheet 2

INVENTOR
Willetta F. Burge
BY M. S. Rambo
ATTORNEY

United States Patent Office 2,798,126
Patented July 2, 1957

2,798,126

SWITCH MECHANISM FOR FISHING ROD REELS

Willetta F. Burge, Delphos, Ohio

Application August 27, 1954, Serial No. 452,512

2 Claims. (Cl. 200—61.39)

This invention relates to line reels for use in connection with fishing rods, poles and the like, a general object of the invention being to provide a line reel in which novel and improved circuit-opening and closing switch mechanism is unitarily incorporated therein and, wherein the mechanism is so formed as to be operative when the line-carrying drum of the reel is rotated in a direction paying out the line associated therewith, whereby to actuate a visual signal of the flash type in indicating to the fisherman, particularly at night, when the submerged bait-carrying end of the line is engaged by fish.

Another object of the invention is to provide a detachable rod-mounted reel for fishing equipment wherein the casing of the reel has formed therewith, as a unitary part of the same, rotatable circuit-making and breaking switch mechanism actuated in unison with the reel drum when the latter is rotated in one direction, and wherein the casing is formed with internal chamber means containing a flashlight or signalling bulb and circuit-energizing battery cells therefor, the operation of which being controlled by the switch mechanism and with all the parts mounted in the reel structure to form a composite structure.

Other objects, advantages and novel constructional features of the invention will become apparent from a consideration of the following description and the accompanying drawings, wherein:

Fig. 1 is a side elevational view of a line reel formed in accordance with the present invention and disclosing the same in a mounted position on the handle end of a fishing rod;

Fig. 2 is a top plan view of the reel and illustrating a part of the casing thereof broken away to disclose internal structure;

Fig. 3 is a vertical sectional view taken through the reel on the plane indicated by the line 3—3 of Fig. 2;

Fig. 4 is a similar view on the line 4—4 of Fig. 2;

Fig. 5 is also a vertical sectional view taken through the reel on the plane of the line 5—5 of Fig. 2;

Fig. 6 is a detail vertical transverse sectional view taken along the line 6—6 of Fig. 4;

Fig. 7 is a diagrammatic view of the circuit controlled by the switch mechanism of the present invention;

Figure 8:
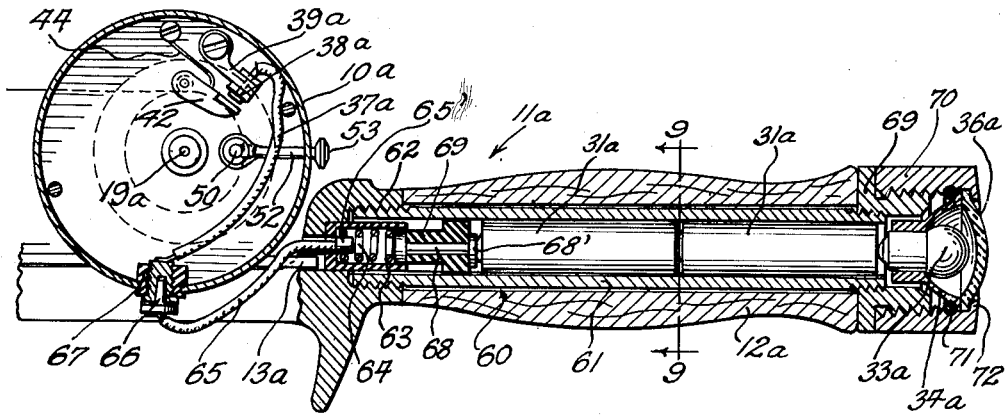
Fig. 8 is a vertical longitudinal sectional view disclosing a modified form of the present invention and in which the signal lamp and its batteries are mounted in the handle section of a fishing rod instead of in the reel proper as in the preferred form of my invention.

Referring to the drawings, and to the form of my invention illustrated in Figs. 1 through 7, the numeral 10 designates a line reel for application to a fishing rod such as that shown at 11. In this instance, the rod has been shown as comprising a handle or grip section 12 which terminates at its forward end in a reel-mounting section 13 which is inwardly and longitudinally recessed as at 14 for the reception of the reel 10. The reel is provided with the usual base strip 15, one end of which is received in a notch 16 of the recess 14 and the other end is engaged with a removable screw-carried nut 17 which when removed from the stud enables the line reel to be removed from or secured in an operative position on the reel section of the rod. At the extreme forward end thereof, the handle section is here shown as provided with a threaded chuck 18 by which the inner end of a resilient rod section is secured to the handle section in forming a unitary rod.

The reel 10, as here illustrated, comprises a frame carrying a line-winding drum or spool 19 to which is secured the inner end of a fishing line 20, the latter being wound about the drum or spool 19 and extended therefrom to pass through the guides 21 of a level winder 22, the line then extending forwardly through suitable guides, not shown, to the outer end of the rod, where it is adapted to be equipped with the usual hooks, sinker weights, natural or artificial bait, spoons, lures or the like, not shown, used by fishermen or anglers in attracting fish.

At one end thereof the frame carrying the reel is formed with a casing 23 in which is contained gearing, not shown, used in imparting rotation about its longitudinal axis to the line drum or spool 19 from the rotatable crank handle 24, the latter being mounted, as usual, exteriorly of the casing and at one side thereof. At the other side of the reel frame, with respect to the casing 23, is a second casing 25, the two casings being rigidly joined and maintained in united relatively spaced frame-forming order by the employment of the parallel uniting and spacing rods 26. The latter have their ends fastened to spaced vertically disposed bearing plates 27 and 27' to which the casings are attached. The drum or spool carries an axial supporting shaft 19a which has its ends supported in jewel bearings 28 carried by the plates 27. The construction of the rod 11 and the reel 10 as so far described is common and well understood by those familiar with such equipment and, therefore, forms no part per se of the present invention, except as background or basic structure upon or in connection with which the line improvements of the present invention are made useful.

In order to provide a fisherman using such equipment with visual signalling means to indicate the presence of a biting fish on the outer or hook-carrying end of the line, particularly when the equipment is used at night, I provide the interior of the casing 25 with a compartment 29. Removably supported in resilient clamps 30 mounted on the outer face of the plate 27 is a pair of small dry cell current-supplying batteries 31. These batteries are united in series and, as shown in Fig. 7, a conductor 32 leads from one of their terminals to the base terminal of a small incandescent lamp bulb 33. The latter is supported, as shown in Fig. 5, in a receiving socket formed in connection with a light reflector 34 which is fastened to the inner peripheral wall of the casing 25. The wall of the casing wherein registry with the reflector is formed with a window opening 35 carried by a colored glass lens 36. When the signal is actively operated, the bulb 33 is intermittently energized so that flashing colored light beams are emitted from the lens for the convenient and positive notification of the presence of a biting fish on the line. Current returns, after passing through the filament of the lamp bulb, to the return side of the battery cells by a ground indicated at 37 in Fig. 7.

To make and brake the energizing circuit for the lamp bulb, the opposite terminal of the battery cells 31, with respect to the terminal connected with the conductor 32, is connected with a conductor 37 which leads to a contact terminal 38 carried on the outer end of a terminal arm 39. The latter is turnably adjustable about the shank of a screw 40 employed in mounting the terminal 38 in connection with the plate 27 and within the compartment 29 of the casing 25, the arm 39 being carried by but insulated from the plate 27.

Disposed for intermittent contact with the terminal 38 is an oscillatory switch arm 42 which is fixed on the outer end of a short shaft 43 and is grounded at 41 on the plate 27. This shaft is journaled in an opening formed in the wall 27 and projects a sufficient distance into the compartment 29 to permit the hub end of the arm 42 to be mounted and secured thereon. A wire spring 44 is fastened at 45 to the outer face of the plate 27 and presses on the arm 42 in a manner serving to maintain the outer end thereof spaced from the terminal 38.

The inner end of the shaft 43 projects beyond the face of the plate 27 opposite to that carrying the arm 42 and has fixed thereon for turning movement with the shaft 43 a pawl 46. The outer end of this pawl engages the periphery of a split circular spring 47, the latter having its center region fastened as at 48 to the inner face of the plate 27. Between the split ends of the spring 48 there is positioned a slidable detent 49, the latter being mounted on a stud 50 which is received in a slidable manner in a slot 51 (Fig. 3) formed in the wall 27. The stud 50 projects at one end into the compartment 29 and has secured thereto the inner end of a stem 52, the opposite end of the stem projecting slidably through an opening in the peripheral wall of the casing 25 and is provided with an externally disposed head 53 for finger actuation.

By sliding the head 53 and its stem 52 inwardly, the stud 50 moves in the slot 51 to bring the pointed and convergingly beveled outer end 54 of the detent 49 into engagement with the teeth of a gear 55 fixed for rotation with the drum or spool 19 and its axial supporting shaft 19a. When in this position, as shown in Fig. 3, rotation of the spool or drum 19 in a clockwise direction, as effected by a pull on the line 20 in the outward direction indicated by the arrow a in Fig. 3, will cause the detent 49 to turn upwardly. By so doing the arcuate upper arm of the circular spring 47 is flexed and lifted, producing rocking movement on the part of the pawl 46 and its mounting shaft 43. The turning movement thus imparted to the shaft 43 is correspondingly transmitted to the switch arm 42, so that the outer end of the latter moves upwardly into circuit-completing contact with the terminal 38 to momentarily energize the signal lamp 33.

The circuit thus established is instantly broken or interrupted by the end 54 of the detent 49 riding off the tooth of the gear 55 producing elevation thereof, the spring 44 serving in this connection to move positively the switch arm 42 to a circuit-breaking position and to bring the end 54 of the detent into positive contact with the next succeeding contacting tooth of the gear 45. It will be evident that as the line 20 continues to be drawn outwardly by the efforts of a fish on the outer end of the line, the latter will advance in the direction of the arrow a of Fig. 3, thus continuing the rotation of the drum 19 and its shaft 19a in a clockwise direction and producing rapidly executed, intermittent opening and closing of the signal light circuit in obtaining a flashing, readily observable and effective visual signal. The detent and gear construction 54 and 55 is such that the detent cannot remain on the top of a tooth of the gear 55 when the latter ceases to rotate in response to line pull, since the force of the spring 44 will serve to move the detent to a centered position in which the outer end 54 thereof will be disposed between the teeth of said gear and thereby normally maintaining the signal circuit deenergized.

When signal operation is not desired, it is merely necessary to pull the head 53 of the stem 52 outwardly. This action results in sliding the stud 50 in its slot 51, so that the inner end 54 of the detent 49 will be withdrawn from engagement with the teeth of the gear 55. The detent will be maintained positively in its withdrawn or inactive position by the split ends of the circular spring pressing on the oppositely beveled sides 56 of the detent. Reverse rotation of the drum or spool 19 with respect to that producing signal operation, as by winding the line on the spool through the operation of the handle 24, merely results in idle downward rocking movement of the pointed end 54 of the detent 49 when the end 54 is disposed in active engagement with the teeth of the gear 55 and without any circuit-completing operation on the part of the switch arm 42. It is only when the detent is actively positioned in contact with the gear 55, and upon outward movement of the fishing line 20, that proper operating conditions are established to produce intermittent circuit closure.

Figure 9:
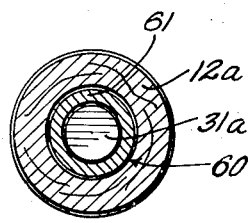
Fig. 9 is a transverse sectional view on the line 9—9 of Fig. 8.
Figure 10:
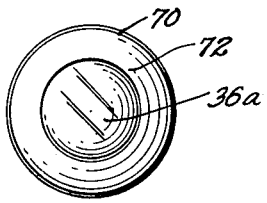
Fig. 10 is an end elevational view of the handle section of the rod shown in Fig. 8.

The construction of the mechanism is, of course, subject to certain variation or modification within the scope of the invention. For instance, in Figs. 8 to 10, the reel shown at 10a is the same as the reel 10 except that in the modified form of reel the batteries and signal lamp are transferred to the interior of the handle section 12a of the rod 11a.

Thus the section 12a is longitudinally bored as at 60 for the reception of a length of tubing 61. The forward end of this section of tubing is externally threaded and received within an internally threaded socket 62 formed in the reel section 13a of the rod. Positioned in this socket and in the open forward end of the tubing 61 is a thimble 63 containing a coil spring 64. Held in the thimble is the headed end 65' of a conductor 65 which extends to a headed contact plug 66 removably positioned in a contact fitting 67 carried by the peripheral wall of the casing 25a of the reel and to which is attached a conductor 37a leading to the arm 39a of the switch mechanism and its terminal 38a. The plug 66 may be readily removed from connection with the fitting 67 when the reel 10a is removed from the rod. This is the only connection which need be made or broken when the reel is attached to or removed from the rod in operating the signal means in the rod handle.

The spring 64 engages at its outer end the inner head of a contact pin 68 carried in an insulating bushing 69 of the tubing 61. The outer head 68' of the pin 68 engages normally with an end terminal of a battery cell 31a. A plurality of these cells are arranged in end to end order in the bore of the tube 61, and at the front thereof a forward terminal of one of the batteries engages the base terminal of an incandescent lamp 33a. This lamp is mounted in the base socket of a reflector 34a, the front of the latter being closed by a colored glass lens 36a. The adjoining end of the tube 61 is externally threaded for the reception of a flanged head 69 which bears on the outer end of the handle 12a. The head 69 is externally threaded for the reception of an internally threaded ferrule 70 which supports the lamp 33a, the reflector 34a and the lens 36a. The peripheral edge of the reflector seats on an annular gasket 71 and is held in contact therewith, together with outer edge of the lens 36a by the inwardly directed positioning rib 72 of the ferrule. The lamp 33a is grounded on the metallic structure of the rod in the same manner as the lamp 33 is grounded as at 37. The same switch mechanism is used in the reel 10a as in the reel 10 and except for the location of the batteries and signalling lamp the construction and operation of the apparatus shown in the two forms of my invention are identical.

I claim:

1. Switch mechanism comprising a frame; a shaft supported by said frame for rotation in either direction about the longitudinal axis thereof; a toothed gear element rotatable in unison with said shaft; a detent pivotally and slidably carried by said frame, said detent having an outer gear element-engaging beveled end formed with rearwardly diverging surfaces which terminate in recesses disposed on opposite sides of the detent; spring means carried by said frame having spaced ends normally received in said recesses to maintain the detent in a resiliently centered position of engagement with and between adjoining pairs of the teeth of said gear element; manually operated means for pivotally supporting and imparting bodily sliding movement to said detent to move the beveled end of the same into and out of engagement with said gear element, said detent being positively maintained in its position of disengagement from said gear element through contact of said spring means with the diverging surfaces of the beveled end thereof; relatively spaced stationary and movable contact members carried by said frame; and means operated by deflection of said spring means as produced by movement of said detent from its normal centered position of engagement with said gear element and in its response to rotation of said shaft and gear element in a single given direction only for moving said contacts rapidly and intermittently into and out of relative circuit-making and breaking engagement with each other.

2. Switch mechanism for fishing reels comprising a supporting frame; a shaft member mounted for rotation in said frame in either direction about the longitudinal axis thereof; a toothed gear element rotatable in unison with said shaft; a detent pivotally and slidably carried in said frame for movement into and out of engagement with the teeth of said gear element; manually operable means connected with said detent for moving the same into and out of engagement with the teeth of said gear element; spring means carried by said frame and engaging said detent for yieldably holding the latter in a centered position with respect to the teeth of said gear element; a pair of relatively spaced stationary and movable contact members; and means connected between said movable contact member and said spring means and operable in response to the deflection of said spring means produced upon engagement of said detent with the teeth of said gear element and upon rotation of said shaft member in one direction only for intermittently moving said movable contact member into electrical contact with said stationary contact member.

References Cited in the file of this patent

UNITED STATES PATENTS

| | | |
|---|---|---|
| 2,086,800 | Harris | July 13, 1937 |
| 2,145,929 | Herman | Feb. 7, 1939 |
| 2,341,390 | Scott | Feb. 8, 1944 |
| 2,427,453 | Hadley | Sept. 16, 1947 |
| 2,580,677 | Hadley | Jan. 1, 1952 |
| 2,663,110 | Guzy | Dec. 22, 1953 |